United States Patent Office 3,329,444
Patented July 4, 1967

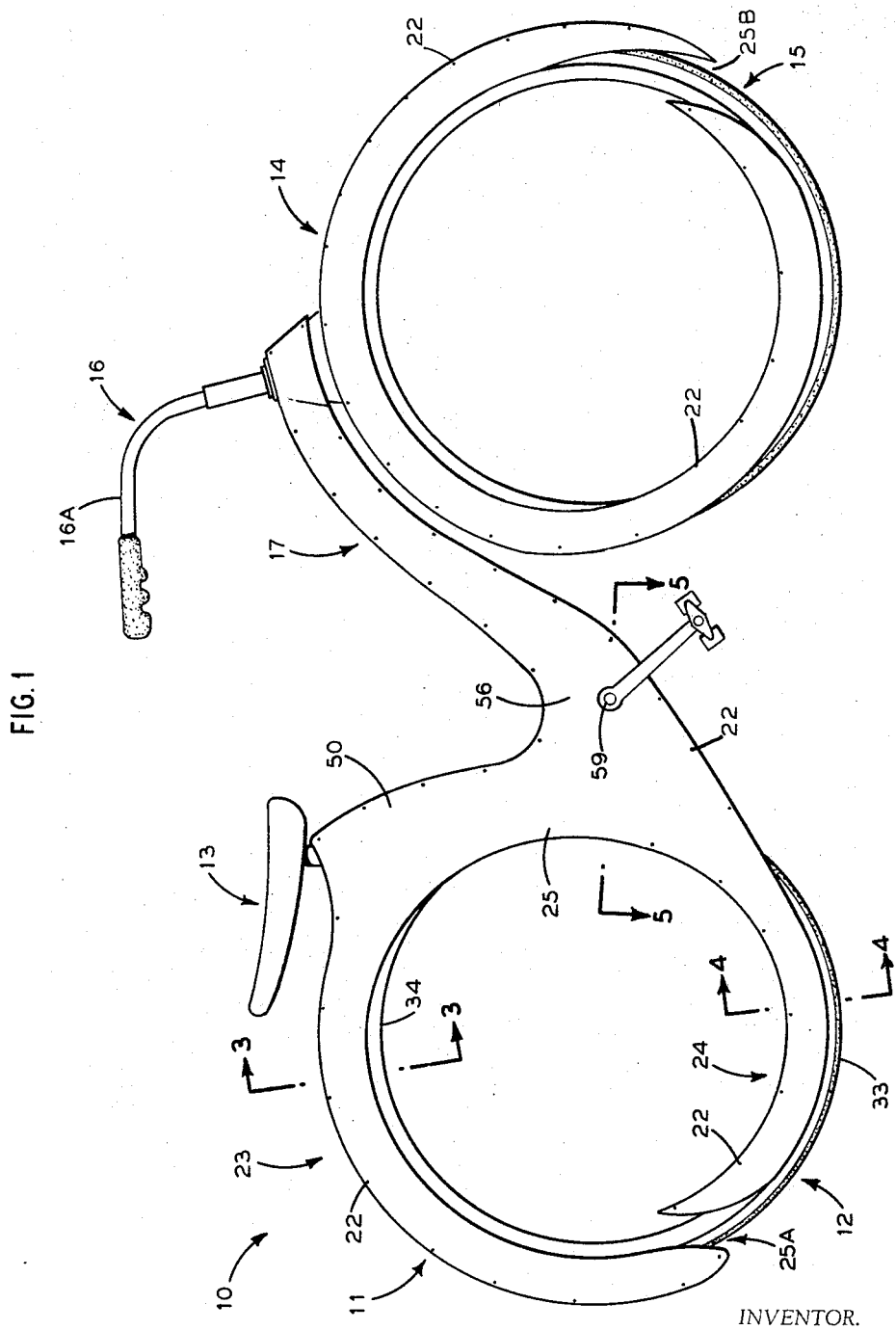

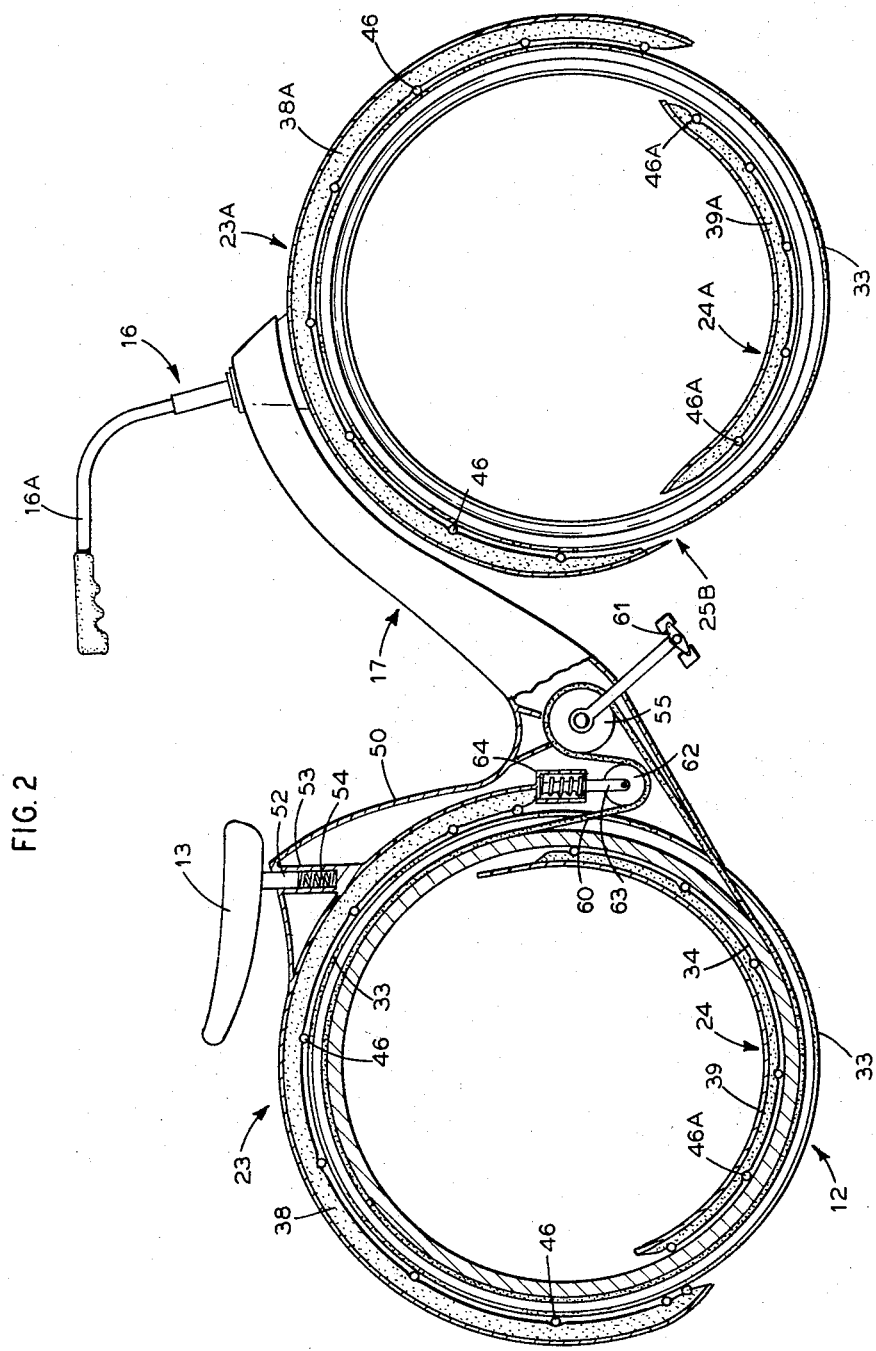

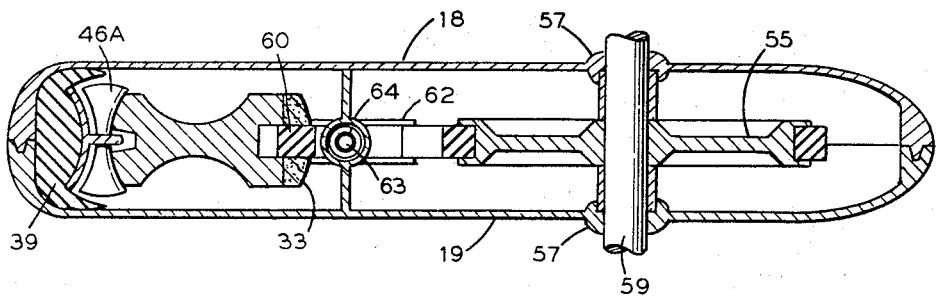
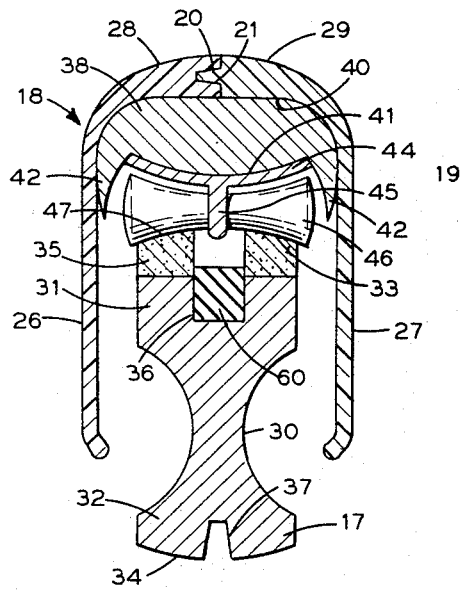
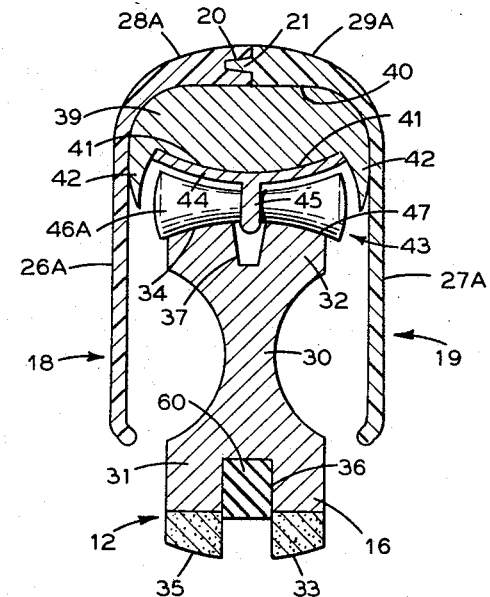

3,329,444
VEHICLE FRAME AND SPOKELESS WHEEL ARRANGEMENT
Arthur Lidov, 157 E. 69th St., New York, N.Y. 10021
Filed Nov. 22, 1966, Ser. No. 596,149
9 Claims. (Cl. 280—210)

This invention relates to wheeled structures, and more particularly concerns transportation means such as bicycles and the like.

Wheeled structures using conventional pneumatic tires such as bicycles, motor vehicles and the like, are limited at least in part, in respect to overall utility, comfort in use and maintenance by the known characteristics of pneumatic tires. Thus, deflation of the tires, for any reason, impairs utility of the structure provided with the tires. Also, steering characteristics of the structure and more particularly, steering control may be adversely affected by the pneumatic properties of the tires at any given time and environmental conditions.

Accordingly, an object of this invention is to provide wheeled structures with non-pneumatic wheel constructions having ground engaging means of rigid material, together with resilient means for mounting the ground engaging means for rotation while providing high shock absorbency and soft riding qualities.

Another object of this invention is to provide in structures of the character described, spokeless wheels distinguished by hard, abrasion resistant ground engaging portions, together with novel frame means for rotatably mounting the wheels with an interposed combination of resilient support and bearing means whereby the structure may be used with comfort and freedom from admitted disadvantages of pneumatic tires.

Still another object of this invention is to provide in a bicycle construction, improved one piece molded plastic wheel members having wear resistant, solid, ground engaging peripheral portions; and frame means for rotatably mounting the wheel members which includes at least one arcuate frame portion for each wheel member which has an angular extent sufficient to retain the mounted wheel member therein; together with resilient pad means and a plurality of bearing members between the frame portion and opposed peripheral portions of the wheel member to maximize the distribution of the load and to minimize the load on each bearing member.

Yet another object of this invention is to provide a bicycle construction of such design and structure as to allow the same to be made of molded plastic parts of integral color through and of light weight; with bearing members of low cost yet high effectiveness in use; the same being resistant to weather and exhibiting a high degree of safety in the event of collision or falls; with economy in manufacture of components and the assembly of the same.

Other objects of this invention will in part be obvious and in part hereinafter pointed out.

In the drawings, FIG. 1 is a side elevational view showing an embodiment of the invention;

FIG. 2 is a side elevational view thereof, similar to that of FIG. 1, and in part in section;

FIG. 3 is a transverse sectional view taken on the line 3—3 of FIG. 1;

FIG. 4 is a transverse sectional view taken on the line 4—4 of FIG. 1;

FIG. 5 is a transverse sectional view taken on the line 5—5 of FIG. 1.

Essentially, the instant invention is directed to a bicycle or other wheeled transport structure, wherein the wheel members are devoid of hubs and spokes, together with novel frame means for mounting the wheel members and resilient means on the frame means for insulating the rider against shock transmited from the wheel members which make direct contact with the ground and without the benefit of pneumatic tires.

Thus, as shown in the drawings, 10 designates one embodiment of the invention, in the form of a bicycle structure. The same comprises a rear frame member generally indicated at 11 for mounting thereon a rear wheel 12 and a seat 13; and a front frame member 14 for mounting thereon a front wheel 15. The front frame member 14 further includes an upstanding post 16 which carries the usual handle bars 16A. Frame member 14 is swivelly mounted on a forwardly extending portion 17 of frame member 11.

The frame members 11, 14 are formed of split, mating sections of molded reinforced high impact synthetic resin; the reinforcing comprising the usual glass fibers distributed through the resin. Thus, member 11 comprises opposed similar sections 18, 19 of desired peripheral contours and including the forwardly extending frame portion 17. Sections 18, 19 have a groove portion 20 and tongue portion 21 respectively which interfit and locate the sections relative to each other. Screws 22 extending transversely of the sections 18, 19 at appropriate points therein, removably secure the sections together.

The frame member 11 at the rear thereof comprises a pair of opposed arcuate portions 23, 24 for receiving therebetween rear wheel 12. Frame portions 23, 24 are integral at their forward ends as at 25, and are split at the rear thereof as at 25A. Sections 18, 19 comprise opposed side walls 26, 27 with meeting top wall portions 28, 29 which include groove 20 and tongue 21 respectively, thus making frame portion 23 of channel cross section and opening downwardly. Similarly, lower frame portion 24 comprises opposed side walls 26A, 27A and top wall portions 28A, 29A, forming a channel shape cross section and also opening downwardly.

Wheel 12 is devoid of hub and spokes, being formed by molding glass fiber reinforced high impact type synthetic resin to desired shape and cross section. Thus, wheel 12 has a transverse section of substantially hour glass shape, including an intermediate neck portion 30 and opposite head portions 31, 32. Head portions 31, 32 have convexly shaped outer surfaces 33, 34 respectively, which constitute the uninterrupted outer and inner peripheries respectively of wheel 12.

As the outer surface 33 of wheel 12 engages the surface over which bicycle 10 travels; head 31 includes a tread portion 35 which incorporates very high abrasion and wear resistant material. Thus, the molded glass-fiber resin mass of tread portion further includes distributed therethrough, diamond grit, silicon carbide and the like.

Wheel 12 is formed with a circumferentially extending groove 36 which extends radially inward from traction surface 33, for the purpose hereinafter appearing. Wheel 12 is also formed with a V shaped groove 37 in head portion 31 which extends radially inward from surface 34, for the purpose hereinafter appearing.

Wheel 12 is received between frame portions 23, 24 in the channel section thereof. The arcuate extent of upper frame section 23 is somewhat greater than 180°, thus retaining wheel 12 therein. Means is provided for resiliently mounting wheel 12 within frame portions 23, 24 to effectively distribute the load and to provide comfortable riding qualities notwithstanding the integral rigid characteristics of wheel 12.

Accordingly, an elongated pad 38 of high resiliency natural or synthetic rubber is mounted within the channel shaped frame portion 23; said pad 38 having a flat upper surface 40, a convex under surface 41 and side wall portions 42. A similar pad 39, having corresponding upper and under surfaces and side walls is mounted within the channel shaped lower frame portion 24.

A series of bearing means generally indicated at 43 are secured in circumferentially spaced relation to the under-surfaces 31 of pads 38, 39. Each bearing means 43 comprises a concave-convex mounting plate 44 which is affixed by its concave surface to convex surface 41 of pads 38, 39, as by suitable adhesive or the like. A collar 45 depends from a central portion of plate 44 for rotatably mounting therein a molded plastic roller bearing 46 having a concave surface 47.

With wheel 12 mounted between sections 18, 19 forming frame portions 23, 24; the outer convex surface 33 of the upper peripheral portion of wheel 12 engages roller bearings 46 at surfaces 37 thereof; while the inner convex surface 34 of the lower peripheral portion of said wheel similarly engages roller bearings 46A on lower frame portion 24. It will be apparent that the load is well distributed over the resilient pads 38, 39 by way of roller bearings 46, 46A; and further, the unit load per roller bearing is minimized, particularly with an increase in the number of bearing means 43 affixed to each of pads 38, 39. The roller bearings 46, 46A may be associated with padding material in long lengths and cut into units to form bearing-pad assemblies of desired length for fitting frame portions 23, 24.

The frame portion 23 includes an integral seat mounting portion 50 for seat 13 which includes a depending stem 52 receivable in a socket portion 53 molded in frame portion 50. A spring 54 in socket portion 53 augments the resiliency of the mounting for seat 13.

Wheel 12 may be rotated by a pedal wheel 55 which is rotatably mounted between frame sections 18, 19 at a point 56 at the juncture of frame portions 17, 23 and 24. Molded portions 57, 58 projecting from sections 18, 19 provide bearing means for the transversely extending pedal shaft 59. An endless belt 60 is entrained about wheel 12 and pedal wheel 55; the belt being received in groove 36 of wheel 12, thus providing transmission means between pedals 61 on pedal wheel 55 and said wheel 12. A tension idler roller 62 mounted on a spring pressed stem 63 received in a molded socket portion 64 within frame portion 56, maintains proper tension for belt 60.

Front wheel 15 is similar to wheel 12 except that belt groove 36 can be of reduced depth. Wheel 15 is rotatably mounted in frame portion 23A similar to frame portion 23, and also having an angular extent somewhat greater than 180° to retain the wheel within the frame portion. Lower frame portion 24A integral with frame portion 23A at the forward end thereof, is similar to frame portion 24 and is in split relation at the front thereof as at 25B, in respect to upper frame portion 23A. Frame portions 23A and 24A include resilient pads and attached bearing means for engaging outer and inner peripheral portions of wheel 15, all as described in connection with wheel 12.

The forward frame portion 17 is swivelly mounted on post 16 of frame member 14, in a manner well known in the art. Suitable brake means, not shown, may be mounted on frames 11, 14, in a manner known in the art, for reducing speed and stopping bicycle 10. It is understood that pedal wheel 55 may be replaced by other suitable means for rotating wheel 12, including gear trains, motor means and the like.

The groove 37 in wheels 12, 15 is adapted to accommodate the projecting collar 45 of bearings 46, 46A. Brush means, not shown, may be mounted on frame members 11, 14 in positions to minimize the ingress of dust, dirt, etc. which may adversely affect bearing members 46, 46A.

While the frame members 11, 14 are described as being formed of molded synthetic resin, it is understood that other materials including metal stampings and the like, may be used to form such frame members.

The wheeled structure of the instant invention is applicable to various transport devices, other than bicycles, including automobiles, trucks, wagons, wheel chairs, and the like.

As various changes might be made in the embodiment of the invention herein disclosed without departing from the spirit thereof, it is understood that all matter herein shown or described shall be deemed illustrative and not by way of limitation, except as set forth in the appended claims.

What is claimed is:

1. A wheeled transportation structure comprising frame means, said frame means comprising at least one arcuate portion, said arcuate portion having an angular extent somewhat greater than 180°, a spokeless wheel member, and means for rotatably mounting said wheel member on said frame portion, said mounting means comprising resilient means located between a concave circumferential portion of said frame portion and a convex outer peripheral portion of said wheel member, and bearing means mounted on said resilient means and in engaging relation to said convex outer peripheral portion of the wheel member.

2. A structure as in claim 1 wherein said frame means comprises a second arcuate portion in opposed relation to said one arcuate frame portion, said wheel member being mounted between said opposed frame portions, second resilient means located between a convex circumferential portion of said second frame portion and a concave inner peripheral portion of said wheel member, and second bearing means mounted on said second resilient means and in engaging relation to said concave inner peripheral portion of said wheel member.

3. A structure as in claim 1 wherein said frame portion is of channel shaped cross section and opening downwardly, said resilient means comprising an elongated elastomeric pad within said frame portion, said bearing means comprising a plurality of bearing members spaced along the length of said pad and fixed to the underside thereof.

4. A structure as in claim 2, wherein said wheel member has its inner and outer peripheral portions of transverse convex cross section, said bearing members being of concave shape for engaging said inner and outer peripheral portions of the wheel member.

5. A structure as in claim 1, wherein said frame means comprises a pair of split, mating sections, and means for removably securing said sections together.

6. A structure as in claim 1, and further including means on said frame means for rotating said wheel member.

7. A structure as in claim 6, wherein said rotating means comprises a pedal wheel and transmission means interconnecting said pedal wheel and said wheel member.

8. A structure as in claim 1, wherein said wheel member is formed of molded, reinforced synthetic resin, and abrasion resistant material incorporated in the outer peripheral portion of said wheel member.

9. A structure as in claim 1, wherein said frame means is formed of molded synthetic resin.

References Cited

UNITED STATES PATENTS

| 436,844 | 9/1890 | Thorp | 280—210 |
| 441,151 | 11/1890 | Garwood | 305—7 |
| 948,859 | 2/1910 | Jackulvis | 280—207 |
| 1,566,467 | 12/1925 | Iznaga | 305—7 |
| 2,450,598 | 10/1948 | Kerr | 280—261 |
| 2,775,492 | 12/1956 | Wirkkala | 305—28 |
| 3,233,916 | 2/1966 | Bowden | 280—281 |

KENNETH H. BETTS, *Primary Examiner.*